Patented July 28, 1942

2,290,889

UNITED STATES PATENT OFFICE 2,290,889

INCREASING CREAM VISCOSITY

Donald Elton Mook, Syracuse, N. Y., assignor to The Borden Company, New York, N. Y., a corporation of New Jersey No Drawing. Application November 29, 1935, Serial No. 52,189. Renewed April 10, 1940

10 Claims. (Cl. 99—55)

This invention relates to the treatment of milk products and more particularly to increasing the viscosity and improving the body and other characteristics of milk products, such, for example, as cream or milk.

In the production of fluid cream for urban distribution, it is common practice to centrifugally separate fluid milk and to pasteurize the resulting cream by any of the established methods of pasteurization. These operations are markedly injurious to the viscosity, whipping quality and other characteristics of the final product, but are carried out in the interests of economy of production and protection of public health. The consumer prefers a cream of high viscosity and good whipping quality, a demand which causes the distributor of bottled cream to seek methods of restoring the natural physical properties which have been impaired by the separation and pasteurization. Various methods of accomplishing this object have been proposed, among which are: addition of calcium sucrate or "viscogen," increase in milk solids-not-fat, heat treatment and cooling of cream after pasteurizing, etc.

It is an object of the present invention to provide an improved method for the treatment of milk products whereby products of superior characteristics may be obtained. It is also an object to provide a new method for offsetting the loss in viscosity and injury to other properties, resulting from the ordinary mechanical separation and/or pasteurization of cream. Another object is to provide an improved method for standardizing fluid cream of high fat content whereby the resulting product may be of greater viscosity or body, of improved whipping quality, and showing less tendency toward serum separation and plug formation than a cream standardized by methods commonly employed. It is also an important object of the invention to accomplish the above mentioned results without substantial alteration of the flavor or of the concentration of milk-solids-not-fat in the cream or other milk product. Other objects will become apparent.

The improved process described herein includes the addition to separated cream, and particularly to pasteurized cream or cream to be pasteurized, of a milk product treated as hereinafter described for the purpose of restoring to the cream, subsequent to its pasteurization, that degree of consistency or viscosity originally characteristic of the said cream but which is materially reduced by present methods of pasteurization, without any substantial change in composition of the resultant cream. For example, a superheated condensed milk or the solids of such a milk may be added to the cream before or after dilution of the superheated product to the serum solids concentration of normal milk, with a resultant restoration of the normal body of the raw cream or even an improvement in the same.

As an illustration of the improved process, ordinary raw skim milk (which may be pasteurized, if desired, by heating it to not higher than about 165° F., although pasteurization is not essential to the improvement) may be evaporated or condensed in any suitable equipment capable of being evacuated and, at the same time, supplied with heat. The evaporation may be carried out within the ranges ordinarily employed in evaporating milk and the operation may be continuous or it may be carried out in batches. In any case, it is desired to maintain the temperature as low as possible during the evaporation. When sufficient water has been removed to concentrate the solids to a substantial degree, for example, at least to about 15 to 20% milk solids-not-fat and preferably to about 24 to 36% milk solids-not-fat, the evaporation is discontinued and the product is superheated. Optimum concentrations and conditions have been mentioned, though it is apparent that other concentrations and conditions may be used, the important feature being that they be such as to give the desired thickening effect during the superheating operation.

The superheating may be accomplished either through the direct application of steam to the product, i. e., bubbling steam through it, or indirectly by application of steam or hot water to the surface of the vessel containing the concentrated milk or through coils submerged in the concentrated milk. As an example, I found that heating a concentrated skim milk containing about 27% total solids at 180 to 190° F. for about 10 to 20 minutes gives a desirable thickening of the product without alteration of the flavor to such an extent as to be noticeable in the final product. The temperature and length of time for applying the heat will vary with the concentration of solids, the previous heat treatment of the skim milk and the territory in which it is produced, for example, temperatures of 160 to 212° F. under atmospheric pressure, or higher temperatures at pressure above atmospheric pressure, may be used with suitable variations in the time. For instance, by subjecting uncondensed skim milk to a temperature of about 300° F. for a minute or two under sufficient pressure to prevent boiling and in such a manner as to avoid burning of the milk solids onto the heating element, the desired effect with little or no alteration in flavor may be accomplished. With such a procedure the condensing or evaporation of the skim milk may be avoided. Such a procedure would be advantageous where the product is to be used directly for the standardization of cream, since it would avoid the necessity of diluting the superheated material. Also, with higher concentrations than those referred to above even lower temperatures might be used to give the desired effect. With intermediate concentrations intermediate optimum temperatures may be determined by preliminary tests.

An important consideration in obtaining the desired effect in the cream product to which the superheated product is added, appears to be to bring about a definite thickening of the milk with little or no alteration in its flavor, and the effectiveness of the product in increasing the viscosity of the cream treated with it, is apparently related to the degree of thickening during this step. This relationship is particularly apparent when the milk product is concentrated before it is superheated. When the product is to be used in a liquid form it is preferred to avoid curdling of the product during the superheating, the heating being carried out in such a manner as to impart to the concentrated product a liver-like consistency without producing a breaking down of the body through "cracking" or "wheying off," i. e., separation of curd from the serum or whey portion. When the product is to be dehydrated, greater improvement in the cream treated may be obtained if the superheating is carried to a point of forming a soft curd in the milk.

The superheated concentrated skim milk from the illustration described above would contain about 70% or more of water and would be of limited keeping quality even when adequately refrigerated. It may, however, be dried by any of the commercial dehydration processes, such, for example, as a spray drying process similar to that described in the Merrell et al. Patent 860,929, without seriously impairing its usefulness in improving the characteristics of cream, as hereinafter described.

The superheated concentrated skim milk prepared as described above or the dried and powdered superheated product may be mixed with a sufficient quantity of water to yield a skim milk of normal solids content, for example, containing approximately 9% of solids by weight. For instance, 50 pounds of the product to be added to the cream may be prepared by adding 45½ pounds of water to 4½ pounds of the dried and powdered superheated condensed skim milk.

In order to improve the characteristics of a cream, the viscosity of which has been reduced by mechanical separation or of a pasteurized cream, the above described superheated concentrated milk product may be added to the cream either before or after pasteurization. For example, this diluted product may be added to cream, preferably of a butter fat content of between 50 and 60%, separated from raw cow's milk by centrifugal separation. The cream may be then pasteurized, by any suitable method, such as placing it in a vat and raising the temperature to 142.5° F. and maintaining it at said temperature for 30 minutes, or by using other conditions of time and temperature which are equivatlent in bacterial destruction, and the cream may be thereafter cooled in any suitable manner to about 40 to 50° F. It is preferred to standardize or dilute the cream as described above, to the desired fat content, for example, to 20 to 40% fat content, before the cream is pasteurized, although an improvement may also be obtained by standardizing the cream with the diluted superheated condensed skim milk, to the degree indicated above, after pasteurization.

As a specific illustration of the process, 100 pounds of 60% cream, containing 60 pounds of milk fat and approximately 3.6 pounds of milk-solids-not-fat, may be standardized to 40% cream by adding to it 50 pounds of reliquefied or diluted superheated skim milk obtained, for example, by adding 33⅓ pounds of water to 16⅔ pounds of skim milk which has been superheated as described above after being concentrated to 27% total solids.

By following the methods described above, I obtain a 40% cream of normal composition and containing approximately 5½% by weight of milk-solids-not-fat and 40% by weight of milk fat. Cream prepared by this method is distinctly heavier in body and superior in whipping quality to one resulting from ordinary processing methods. For example, a 53% cream standardized down to a fat content of 40% with a diluted superheated concentrated skim milk has been found to have a viscosity of 313 seconds, as compared with 204 seconds for the same cream standardized with normal skim milk, 208 seconds for the same cream standardized with a water solution of a standard powdered skim miilk and 226 seconds for the same cream standardized with a diluted plain evaporated skim milk. These viscosity measurements were made with the flowmeter described in the "Journal of Dairy Science," volume XIV, page 3, 1933, at 60° F. after storage of the standardized cream for 24 hours at about 40° F.

The degree of improvement obtained by the method described above varies directly with the range of butter fat reduction effected with the diluted superheated evaporated milk. For example, the lowering of 60% cream to a fat content of 20% leads to a very much greater improvement than standardization of a 30% cream to 20% fat content.

The improvement in fluid cream resulting from utilization of the reliquefied dried superheated concentrated milk is somewhat less than from the use of diluted undried superheated evaporated skim milk, but the greater transportability, keeping quality and uniformity obtainable in using the dehydrated product lends itself advantageously to routine commercial practice.

In following the methods described above, the normal serum solids concentration of the resultant cream is not altered, but the heat treatment of the condensed milk results in a desirable improvement in the viscosity, whipping quality, reduction in serum separation and reduction in tendency to form plug and improvements in other properties of the cream. In carrying out the process, the cream may be separated from a particular portion of whole milk, the skim milk obtained by the separation may be condensed and superheated as described above, and may then be diluted to give about the solids content normally present in the skim milk and then may be used in standardizing the cream from which it was separated, to the desired concentration of butter fat. Of course, it may also be used in the standardization of some other body of cream or in improving the characteristics of some other milk product.

While skim milk has been referred to in describing the invention, as the material to be subjected to this special treatment, this is merely illustrative, since fluid whole milk or partially skimmed milk also may be employed in the same manner as the skim milk in the preparation of the superheated normal or evaporated product or the dehydrated superheated normal or evaporated product. Where whole or partially skimmed milk is used, the optimum concentration of the condensed product and the optimum temperature and time of superheating may vary somewhat due to the higher concentration of butter fat, but the thickening effect appears to parallel the milk-solids-not-fat concentration. Also, I have described the addition of the diluted superheated condensed skim milk or the diluted dehydrated superheated condensed skim milk to cream in standardizing the cream. It also may be used for other purposes, for example, it may be added to whole milk or other milk products to enhance the cream volume or other qualities of the milk or other milk product. Also, instead of standardizing with the diluted superheated condensed milk, the superheated condensed milk may be added directly to the cream or other milk product and water may be added to dilute the serum solids to substantially the concentration present in the milk product previous to condensing or, if desired, to some higher or lower concentration.

In general, the higher the concentration of milk serum solids in the product being superheated, the lower the temperature and the shorter the time required to obtain the desired effect by superheating. The effect upon the viscosity of the cream to which the superheated product is added appears to parallel the thickening of the superheated condensed skim or whole milk. It is apparent that to maintain a uniformly heavy bodied cream, considerable attention must be given to the preparation of the superheated product.

Reducing the fat content of raw cream as little as 5% with this product has given appreciably heavier bodied pasteurized cream. After standardization of raw cream, it may be pasteurized and handled in any of the accepted methods. No unnatural flavor seems to be imparted to the cream through use of properly prepared superheated condensed skim milk even though the concentration of fat in raw cream may have been reduced over 60% in standardizing.

In using our improved process 1% of additional milk-solids-not-fat over those normally present in a cream standardized with skim milk, may be present without being hardly noticeable from the standpoint of flavor. If desired, still greater increases in viscosity may be obtained by adding the superheated condensed skim or whole milk or powdered superheated condensed skim or whole milk in such dilutions as to give 1 to 2% excess of milk-solids-not-fat in the standardized cream or even higher.

It is apparent that many modifications may be made in the methods of preparing my new product and in the use of it and it is not intended to limit the invention to the particular embodiments described. The terms used in describing the invention have been used as terms of description and not as terms of limitation and it is intended that all equivalents of the terms used be included within the scope of the appended claims.

Dry milk products and the preparations thereof, disclosed but not claimed herein, are claimed in my copending application Serial No. 348,737, filed July 31, 1940.

What I claim is:

1. A method for preparing a fluid milk product comprising concentrating a fluid milk product to greater than 15% total solids, superheating the product to produce a pronounced thickening of the product without causing curdling, the temperature of superheating being higher for lower concentrations of serum solids and the time of superheating being shorter for higher concentrations of serum solids, diluting the superheated product and adding it to another fluid milk product.

2. A method of preparing a fluid milk product comprising concentrating a milk product of the class consisting of skim milk, partially skimmed and whole milk, to a concentration of not less than 15% serum solids, superheating the concentrated milk product at about 160 to 210° F. for sufficiently long to produce a pronounced thickening of the product without causing substantial curdling, diluting the superheated product and adding it to another fluid milk product.

3. A method as defined in claim 2 in which skim milk is concentrated to about 20 to 30% total solids.

4. A method of standardizing cream comprising concentrating a milk product to not less than 15% serum solids, superheating the concentrated milk product at a temperature of about 160–210° F. for a sufficient time to produce a pronounced thickening, the temperature of superheating being higher for lower concentrations of serum solids and the time of superheating being shorter for higher concentrations of serum solids, diluting the milk product and standardizing the cream to the desired percentage of butter fat by adding the diluted superheated condensed milk product.

5. A method of standardizing cream comprising concentrating a milk product of the group consisting of whole milk, skim milk and partially skimmed milk to about 15 to 36% serum solids, superheating the concentrated product at a temperature of about 160–210° F. for a sufficient time to produce a pronounced thickening, the temperature of superheating being higher for lower concentrations of serum solids and the time of superheating being shorter for higher concentrations of serum solids, diluting the superheated product sufficiently so that when added to cream in the quantities required to give the desired butter fat concentration, it will not increase the milk solids-not-fat substantially above those normally present in cream diluted to the butter fat concentration desired and adding the said diluted superheated product to the cream to standardize it to the desired butter fat content.

6. A method of standardizing cream comprising evaporating skim, whole or partially skimmed milk under a vacuum to a concentration greater than 15% serum solids, superheating the product at a temperature of about 160–210° F. for sufficient time to produce a pronounced thickening, the temperature of superheating being higher for lower concentrations of serum solids and the time of superheating being shorter for higher concentrations of serum solids, drying the product, diluting the dried product to a milk-solids-not-fat concentration substantially that of normal skim milk and adding the diluted product to the cream to standardize it to the desired fat content.

7. A method as defined in claim 6 in which skim milk is concentrated to a total solids content of about 25 to 30% and is superheated at about 180 to 190° F. for about 10 to 20 minutes.

8. A method of producing a standardized pasteurized cream of increased viscosity, comprising superheating skim milk solids, diluting the superheated skim milk solids with water to a normal skim milk concentration, standardizing the raw cream with the diluted superheated skim milk solids and pasteurizing the standardized cream.

9. A method of producing a pasteurized cream of increased viscosity comprising standardizing the pasteurized cream with superheated skim milk solids diluted with water to about a normal skim milk concentration.

10. A method of preparing a fluid milk product comprising treating a milk product of the class consisting of skim milk, partially skimmed and whole milk, containing about 15 to about 36% of serum solids of normal composition by superheating said product at about 160 to 212° F. for a short time to produce a pronounced thickening without causing substantial curdling or alteration in flavor, the temperature of superheating being higher for lower concentrations of serum solids, the time of superheating being shorter for higher concentrations of serum solids, and adding the superheated serum solids together with water to a high butter fat milk product to produce a final milk product containing a substantially normal ratio of butter fat to serum solids but having a greater than normal viscosity.

DONALD ELTON MOOK.